June 27, 1961  R. E. BARNETT  2,990,442
SPIN ACTIVATED BATTERY
Filed March 12, 1959
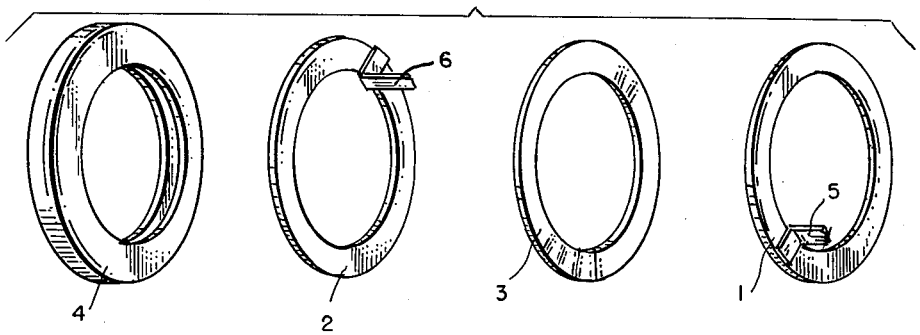
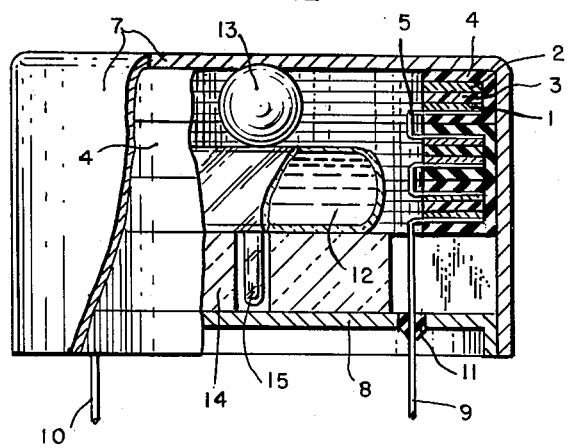
INVENTOR,
ROBERT E. BARNETT
BY
Harry M. Saragovitz
ATTORNEY.

United States Patent Office 2,990,442
Patented June 27, 1961

2,990,442
SPIN ACTIVATED BATTERY
Robert E. Barnett, Joplin, Mo., assignor to the United States of America as represented by the Secretary of the Army
Filed Mar. 12, 1959, Ser. No. 799,057
1 Claim. (Cl. 136—90)

This invention relates to a reserve type battery capable of activation by set back shock and spin, used as a power source for transmitter and receiver of beacon type equipment in projectiles or shells as, for instance, in shells having a proximity fuse.

It is an object of the invention to produce a spin activated battery capable of casual storage for a period of five years thruout a temperature range of −80° F. to +165° F. in an inactivated condition without deterioration. The battery shall be capable of efficiently exhausting its capacity within 30 seconds to 3 minutes thruout a temperature range of −65° F. to +160° F.

The battery shall further be capable of automatic activation to full operating voltage under load in 0.5 second or less at the above-mentioned temperatures upon application of shock ranging from 500 to 10,000 g's and spin about the vertical axis ranging from 500 to 20,000 r.p.m.

These and other objects of the invention are achieved by using the electro-chemical system cadmium-fluoboric acid-lead peroxide in a special cell structure which will become more apparent from the following description of a specific embodiment of the present invention as shown in the accompanying drawing, in which FIG. 1 shows a perspective view of the several elements of a single cell, and FIG. 2 shows a front elevation partially broken away to show cross-sectional views of the spin activated battery.

Each cell of the spin activated battery consists as shown in FIG. 1 of a positive plate 1, a negative plate 2, a separator 3 and a cell container 4 consisting of a rubber sleeve which has somewhat the form of an automobile tire. The positive plate 1 consists of a flat ring having a grid of sheet nickel of about 0.002 to 0.003″ thickness, formed by punching the center out of a disc, resulting in a ring having an outside diameter of two inches and an inside diameter of about 1.40 inches. Nickel is chosen because of its relative resistance to corrosion by fluoboric acid as compared to other metals. This is turn diminishes the effects of a couple between the positive material and the positive grid. This nickel grid is prepared for plating by rinsing it in trichloroethylene or any other degreasing agent and then dipping into nitric acid to etch the surface of the nickel. Lead peroxide is then deposited electrolytically in known manner from either lead nitrate or lead fluoborate solutions. The deposit from the lead nitrate solution is softer and adheres to the grid better than the deposit from the fluoborate bath.

The negative plate 2 consists of a flat ring of 40 x 40 mesh nickel screen plated with cadmium.

Cadminum electrodes have proved to be superior to zinc electrodes which have been found undesirable for use in a spin activated battery because of the precipitation of sponge lead. This precipitated sponge lead results from the fact that both the lead peroxide and the zinc are soluble in fluoboric acid. Since zinc is above lead in the electromotive series, it immediately displaces the lead as a spongy deposit which shorts the cell.

In a conventional 2-plate cell discharged under normal conditions shortening may be prevented by using semi-permeable separators such as cellophane. In spin activated batteries, however, the edges of the plates are exposed and the centrifugal force throws the precipitate towards the edges of the cell and shorts the plates at the exposed edges. Altho cadmium is also above lead in the electromotive series and will therefore displace lead, the precipitate does not come down as a spongy mass but remains more as a film on the cadmium negative plate itself. Therefore, a spin type battery may be successfully operated with cadmium negative plates.

The separator is made of corrugated and perforated sheets of polyvinyl alcohol. Separators made of such material provide for rapid circulation of the electrolyte at the moment of spin activation of the battery.

The negative electrode 1 and the positive electrode 2 carry intercell connector tabs 5 and 6. To assemble a single cell the electrodes 1 and 2 and the separator 3 are inserted into the rubber sleeve 4. By increasing the ring-like battery elements in the rubber sleeve 4 the outer edges of the ring electrodes 1 and 2 are insulated from each other while the free inner edges will allow the electrolyte to penetrate into the cell assembly as soon as a centrifugal force is developed by the spin of the shell.

As shown in FIG. 2 three such cells are stacked together, connected in series by the cell connector tabs 5 and 6 and inclosed in a metal housing 7 which is hermetically sealed by means of a metal lid 8. Terminals 9 and 10 are led thru the metal lid 8 in the manner shown for the terminal 9 by providing an electrically insulating seal 11 in the lid 8.

An ampule 12 made of frangible material, e.g., glass, and filled with fluoboric acid is interposed in the center of the housing 7 between a steel ball 13 and a plastic spacer 14. This plastic spacer has a centrally located hole to receive the neck 15 of the ampule 12.

If the ampule 12 is broken by set back shock, the spin of the shell throws the electrolyte by centrifugal force into the cells, care being taken that the ampule is positioned in the center of the housing 7 in such a manner that the centrifugal force throws the electrolyte against the free openings of the three cells. The amount of electrolyte must be sufficient to fill the cells adequately.

The battery according to the invention is capable of being spin activated to full operating voltage under load in 0.5 second or less at all temperatures upon application of shock, ranging from 500 to 10,000 g's and spin about the vertical axis ranging from 500 to 20,000 r.p.m. The battery is capable of satisfactory activation at elevations up to 2 miles above sea level and satisfactory operation at elevations up to 50 miles above sea level in all positions.

While there has been described what at present is considered to be a preferred embodiment of the invention, it will be obvious to those skilled in the art that various changes and modifications may be made therein without departing from the invention as defined in the appended claim.

What is claimed is:

A reserve type battery for projectiles capable of being activated by set-back shock and spin comprising a hermetically closed cylindrical metal housing, said housing inclosing a battery of concentrically arranged ring-shaped primary cells connected in series and aligned perpendicularly to the axis of the said cylindrical housing, each cell comprising an open rubber-sleeve cell-container of tire-like shape with the opening directed towards the center of said cylindrical metal housing, said rubber-sleeve cell-container holding ring-shaped elements consisting of a lead peroxide cathode carried by a grid of sheet nickel, a corrugated and perforated sheet of polyvinyl alcohol as the separator, a cadmium anode carried by a nickel screen, a frangible ampule filled with an acidic electrolyte, said ampule being positioned in the center of said cylindrical metal housing whereby the openings of said rubber-sleeve containers are facing said ampule, and means for breaking said ampule by set-back shock.

References Cited in the file of this patent

UNITED STATES PATENTS

| 2,616,939 | Fischbach | Nov. 4, 1952 |
| 2,852,592 | Salauze | Sept. 16, 1958 |
| 2,931,849 | Burrell | Apr. 5, 1960 |

OTHER REFERENCES

"Product Engineering," November 1945, page 783, column 3.